United States Patent [19]

Moreau

[11] Patent Number: 5,918,535
[45] Date of Patent: Jul. 6, 1999

[54] APPARATUS FOR SUSPENDING AN INNER BASKET WITHIN AN OUTER POT OF A COOKING VESSEL, AND METHOD FOR USING SAME

[76] Inventor: Donnie R. Moreau, 801 Rebecca Dr., Houma, La. 70360

[21] Appl. No.: 08/992,401

[22] Filed: Dec. 17, 1997

[51] Int. Cl.⁶ .............................. A47J 37/12; A47J 45/00
[52] U.S. Cl. ............................... 99/413; 99/415; 99/419; 294/26; 294/32
[58] Field of Search .............................. 99/413, 410, 412, 99/411, 414, 415, 416, 419; 294/12, 27.1, 32, 26

[56] References Cited

U.S. PATENT DOCUMENTS

| | | | |
|---|---|---|---|
| 1,337,540 | 4/1920 | Burlingame | 294/26 |
| 1,555,605 | 9/1925 | Pomeroy | 294/26 |
| 2,021,465 | 11/1935 | Ritscher | 99/414 X |
| 2,156,214 | 4/1939 | Woodman | 99/413 X |
| 2,613,978 | 10/1952 | Marulli | 294/27.1 |

FOREIGN PATENT DOCUMENTS 1068289   6/1954   France ...................................... 99/413

Primary Examiner—Reginald L. Alexander
Attorney, Agent, or Firm—Jesse D. Lambert

[57] ABSTRACT

Apparatus and method for suspending the basket, of a cooking vessel comprising a pot and inner basket, inside of the pot, to permit drainage of the basket and food inside the basket into the pot after cooking the food in a liquid cooking medium (such as water or cooking oil) contained in the pot. The apparatus comprises a generally S-shaped member, having upper and lower oppositely-facing hooks joined by an intermediate section. A handle may be attached to the apparatus. To use the apparatus, the basket is lifted to a height above the liquid level in the pot. The lower hook is inserted into a perforation in the basket, and the basket and apparatus is then lowered until the upper hook hooks over the top rim of the pot. The basket then rests suspended in the pot above the liquid level therein, with the side of the basket opposite the side in which the lower hook of the apparatus is inserted bearing against the adjacent inner wall of the pot.

11 Claims, 2 Drawing Sheets

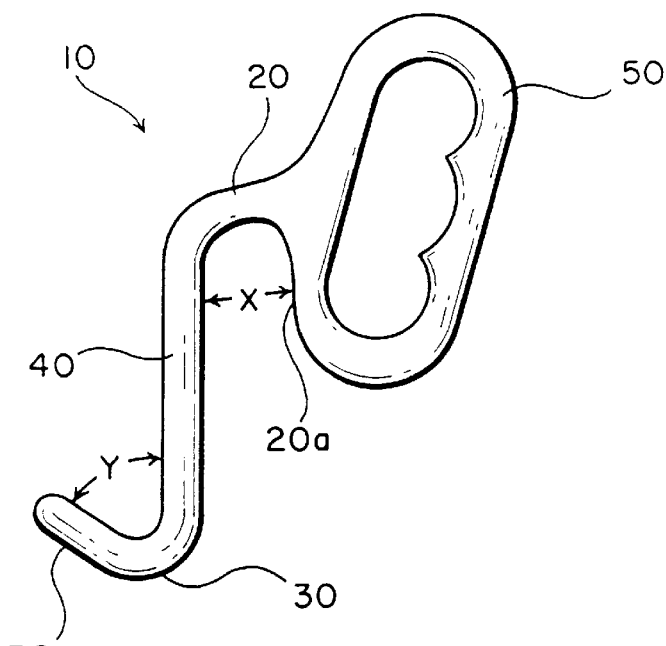
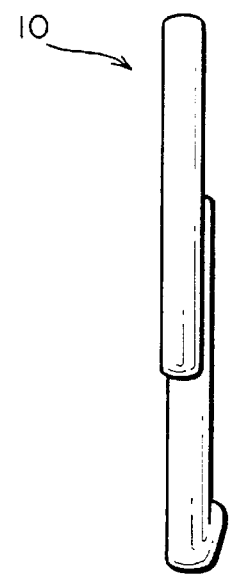
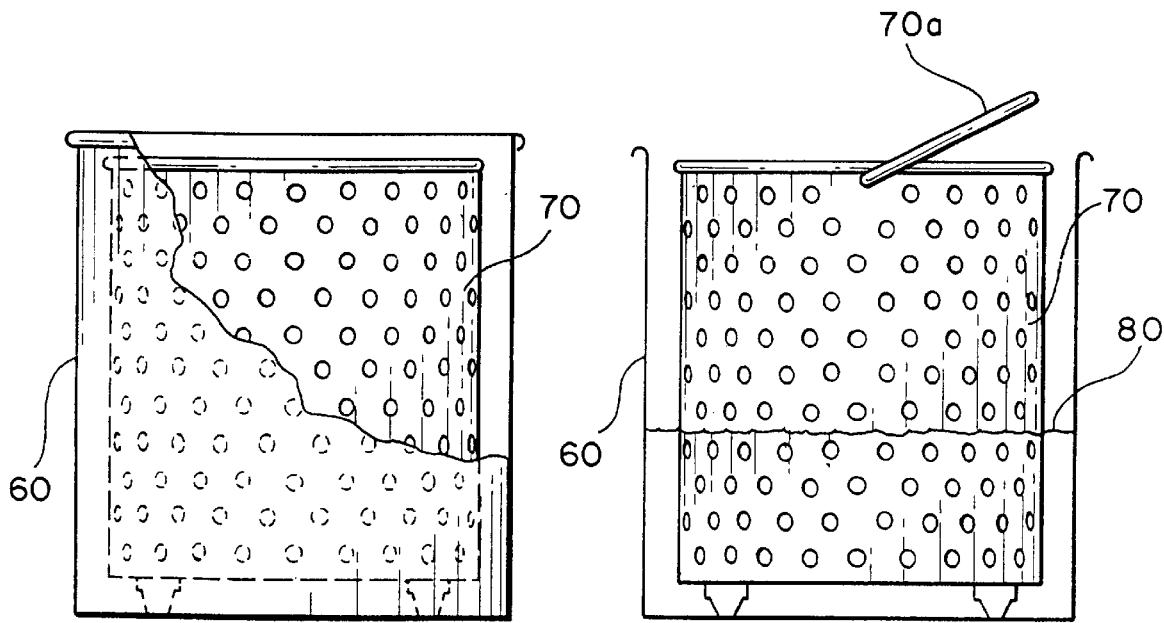

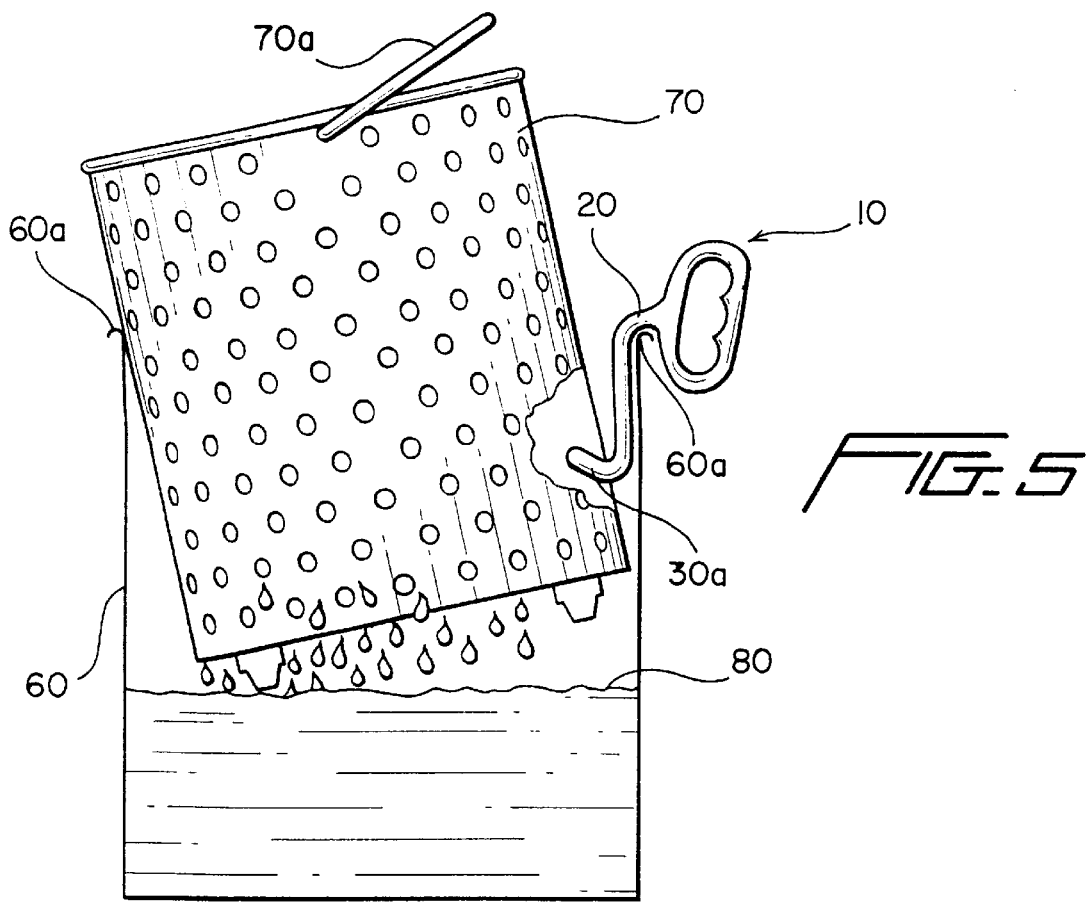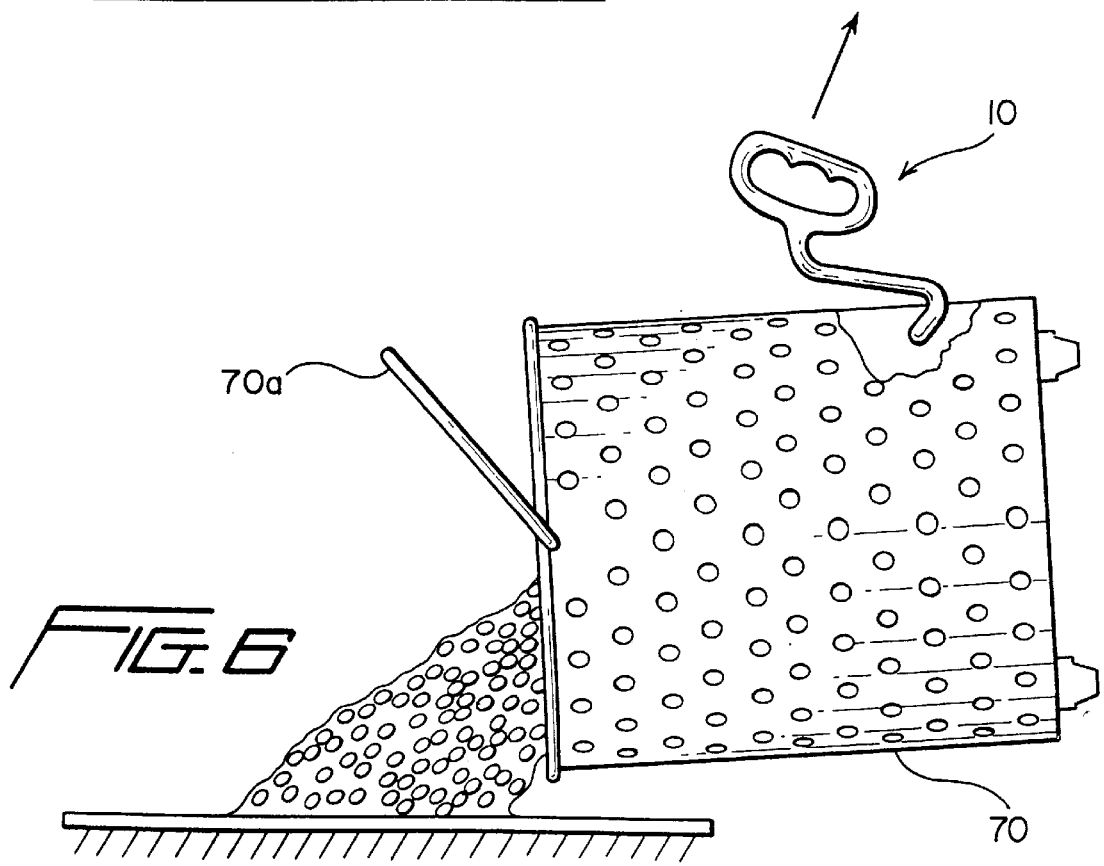

APPARATUS FOR SUSPENDING AN INNER BASKET WITHIN AN OUTER POT OF A COOKING VESSEL, AND METHOD FOR USING SAME

BACKGROUND—FIELD OF THE INVENTION

This invention relates to apparatus employed in cooking foods. With greater particularity, this invention relates to apparatus used in conjunction with a cooking vessel comprising a pot and a basket removably contained within the pot, to enable suspending the basket within the pot, above a liquid level within the pot, to permit the basket and foods in the basket to drain into the pot.

BACKGROUND—DESCRIPTION OF THE RELATED ART

Cooking of many different foods, including vegetables, meats, and seafood such as fish, shrimp, crawfish, crabs, and the like, is done by placing the food in a perforated basket, which is in turn placed into a larger pot. Typically, the pot contains a volume of liquid, such as water or cooking oil, in which the food within the basket is boiled or fried. Such arrangements have the advantage of permitting cooking of large volumes of individually small pieces of food, and readily placing the large volume of food into the pot and removing same, without the tedious process of scooping out small pieces of food cooked in a large pot. Through use of the basket, the entire volume of food may be placed into and removed from the pot at essentially the same time. Another desirable attribute of a basket/pot combination is that the cooking liquid, be it water or cooking oil, that is entrained on, in, and around the food is desirably drained back into the pot after cooking is complete, by suspending the basket over the pot but above the liquid level in the pot.

One application in which this basket/pot arrangement is used is in the boiling of shellfish, such as crawfish, in relatively large basket/pot combinations capable of boiling, by way of example only, 50 pounds or more. Such amounts of crawfish contained within the basket are too heavy for a person or persons to easily hold up over the pot, to permit the excess water in the basket contents to drain back into the pot. A significant volume of the typically highly seasoned water in which the crawfish are boiled is contained in the body cavities of the crawfish, and on and around the crawfish, and it is desirable to drain such liquid back into the pot. Although the invention will be described in connection with the boiling of crawfish in this manner, it is to be understood that the invention is not so limited but may be employed in the boiling or frying of many different types of foods.

The related art shows several apparatus that generally permit suspension of an inner basket within an outer cooking pot, with the basket and/or pot specially configured to permit suspension. All of the known devices have various shortcomings. For example, U.S. Pat. No. 325,188 to Tate (Aug. 25, 1885) discloses a cooking utensil comprising an inner perforated basket within an outer pot. The inner basket is specially constructed to include a pair of slots at opposite points on the circumference of the basket, part of the distance from the top of the basket. A support member generally in the shape of a flat bar may be inserted through the slots, spanning the diameter of the basket and protruding out on both sides of the basket sufficiently far to span the diameter of the outer pot. The support member then placed across the top of the outer pot suspends the inner basket within the outer pot. The invention of Tate has several disadvantages, however. The inner basket must be specially constructed to include relatively large slots to accommodate the support. Only a limited volume of food may be placed in the basket, only to such a level as to not interfere with insertion of the support member through the basket. Only one level or height of suspension of the inner basket is possible, so that accommodating different liquid levels within the outer pot may not be done. Finally, although the invention of Tate provides a handle on the support member to aid in the manipulation of the basket after final removal of the basket from the pot, placement of the handle at a relatively large distance above the bottom of basket greatly limits its utility.

U.S. Pat. No. 713,575 to Von Uffel (Nov. 11, 1902) discloses another type of basket suspension device permanently attached to both the basket and the pot. The Von Uffel patent discloses a pot having at least one support attached to the side of the pot and projecting upwardly therefrom. The support terminates in an eye having an elongated opening. The basket has a hook also attached to one side and projecting upwardly therefrom, the hook fitting into the eye of the support on the pot, and suspending the basket over the pot. This apparatus also provides only a single suspension height of the basket within the pot. Also, the permanently attached support and hook protrude above the rim of the pot and basket, rendering both pot and basket more bulky. The configuration of the support eye and hook tend to collect food particles, built up oil, etc. and are hard to clean. Furthermore, such arrangement is designed to be integral with the pot and basket, and is not adaptable to use on cooking vessels not so equipped.

The related art apparatus share a number of disadvantages:

they are specially constructed baskets or basket/pot combinations, incorporating certain modifications to the basket and pot, preferably at manufacture, to enable suspension of the basket within the pot;

the apparatus comprise substantially permanent modification or attachment to the pot and/or basket, to provide structure usable in suspending the basket within the pot;

certain related art apparatus limit the portion of the basket which may contain food;

certain related art apparatus utilize upward projecting supports which protrude above the rim of the pot and/or basket, providing an obstruction to handling and providing a receptacle for collecting food particles, etc., and being difficult to clean.

None of the related art patents show apparatus not permanently attached to either the basket or pot, which permit suspension of the basket within the pot at a selected variable level above a liquid level in the pot.

OBJECTS AND ADVANTAGES

Accordingly, among the objects and advantages of the present invention are to:

in a cooking vessel comprising a basket and a pot, provide an apparatus for securely suspending the basket within the pot, above a liquid level in the pot, to permit the basket and the food contents thereof to drain into the pot;

to provide such apparatus which is not permanently attached to either the basket or the pot;

to provide apparatus which is readily usable and adaptable to many sizes and configurations of basket/pot combinations;

to provide apparatus which is usable with many commercially available "off the shelf" basket/pot combinations, without requiring modification of either the basket or the pot;

to provide apparatus which is simple and inexpensive to manufacture from a variety of materials;

which is able to suspend the basket at variable heights within the pot, to ensure that the basket is above the liquid level in the pot but as low as possible for safety purposes;

to provide an apparatus for suspending a basket within a pot which does not limit the volume of food which may be contained within the basket;

to provide a cooking vessel combination comprising a basket, a pot, and apparatus not permanently attached to either the basket or pot, which permits suspension of the basket within the pot at a desired level; and to provide a method for suspending a basket within the pot of a basket/pot cooking vessel combination, with apparatus not permanently attached to either the basket or the pot and adaptable to a large range of basket/pot combinations.

BRIEF DESCRIPTION OF THE DRAWINGS

FIG. 1 is a side view of the apparatus of an embodiment of the present invention.

FIG. 2 is a rear, slightly quartering view of the apparatus.

FIG. 3 is a side view in partial cross section of a typical basket and pot cooking vessel combination.

FIG. 4 is another view of a basket and pot combination, the pot in full cross section, illustrating a liquid level in the pot.

FIG. 5 is a side view in cross section showing a basket suspended within a pot, above a liquid level in the pot, by the apparatus of the present invention.

FIG. 6 is a schematic of the apparatus of the present invention being used to aid in inverting a basket having food therein, in order to pour the food out.

DESCRIPTION OF THE PREFERRED EMBODIMENT

A typical embodiment of the present invention is shown in FIG. 1. Apparatus 10 is generally S-shaped and comprises upper hook 20 and lower hook 30, joined by intermediate section 40. Upper hook 20 and lower hook 30, in the preferred embodiment, are substantially oppositely-facing. A handle 50 is attached to apparatus 10, preferably attached to upper hook 20. Handle 50 may comprise a closed loop, as shown in FIG. 1, or may comprise a T-shaped piece or other appropriate shape providing secure gripping. The shape and dimensions of upper hook 20 are adapted to hook over a top rim of a conventional pot as may be used for boiling crawfish and other seafood, vegetables, and the like, or for deep frying of fish and other foods. However, the shape and dimensions of upper hook 20 may be adjusted as desired to conform to many different sizes of pots. By way of example, the opening of the throat of upper hook 20, shown as dimension X, may be approximately ¾". Section 20a of upper hook 20 may be generally parallel to intermediate section 40. By way of example only, the length of intermediate section 40 may be approximately 3 inches.

Handle 50 is attached to apparatus 10, preferably on section 20a of upper hook 20, to provide a means for readily placing apparatus 10 in proper position with respect to a basket and pot and to assist in pouring food out of the basket, as will be later described. The particular embodiment shown in FIG. 1 is a loop or ring-type handle, having an opening sufficiently large so that at least one, and preferably several, fingers may be inserted therethrough for secure handling. Finger grooves may be provided as shown to enhance gripping. Other embodiments of handle 50 could comprise a T-shaped member or any design which permits secure grasping.

Lower hook 30 faces substantially oppositely upper hook 20 and has section 30a proximal to the terminal end of lower hook 30. Although various shapes and dimensions may be used, in the preferred embodiment section 30a is approximately 1-½" long with an angle Y between section 30a and intermediate section 40 suitable to suspend a basket therefrom as will be later described. Angle Y is preferably between about 90 degrees and about 10 degrees. The terminal end and at least a portion of section 30a are advantageously substantially round in cross section and the terminal end of section 30a is tapered to a blunt point, for ease of insertion into a basket perforation. However, it is understood that different shapes, dimensions, and configurations may be used, and such details herein are given by way of example only.

A variety of materials may be used to fabricate apparatus 10. In one embodiment, a high strength tempered plastic material is used. Materials such as plastics have the advantage of low cost, high strength, and low heat conductivity, resulting in decreased need to wear protective clothing when manipulating apparatus 10 after exposure of apparatus 10 to high temperatures, such as from hot water or steam. Such plastics may be molded or cast forming apparatus 10 in one piece, with a desired cross-sectional shape of upper hook 20 and lower hook 30, intermediate section 40, and handle 50 (which may be rectangular, circular, or other desired shape). However, other materials may be used, such as round metal stock, of steel, aluminum, or the like, which may be formed in the desired shape and handle 50 attached by welding or other like means.

With regard to shape and dimensions, while the invention is not limited to any particular shape or dimension but rather may be altered as desired to suit particular basket/pot combinations, dimensions for one embodiment are given hereinabove in the description of the different sections of apparatus 10.

FIG. 2 is a rear, slightly quartering view of an embodiment of apparatus 10.

Use of apparatus 10 in boiling seafood will now be described. FIG. 3 illustrates a typical basket and pot cooking vessel combination, with pot 60 shown in partial cross section having basket 70 nested therein. As described above, such basket/pot combinations are commonly used to boil seafood such as crawfish, shrimp or crabs in seasoned water, but such arrangements may be also used to boil vegetables or deep fry foods such as fish. Typically, basket 70 has an outer diameter approximately 1" less than the inner diameter of pot 60, yielding an annular space of about ½" between basket 70 and the inner wall of pot 60. Basket 70 is provided with a number of perforations or other openings to permit drainage of entrained liquids from food cooked in basket 70.

FIG. 4 is another view of a basket/pot combination, with pot 60 in cross section and a liquid level 80 in pot 60. Basket 70 may be equipped with a folding bail 70a to facilitate insertion and removal of basket 70 from pot 60, as will be hereinafter described.

Upon completion of the boiling process, basket 70 is raised from its cooking position within pot 60 to a desired height, preferably above liquid level 80, although lower levels could be used if only partial drainage of the contents of basket 70 is acceptable. To suspend basket 70 within pot 60, as shown in FIG. 5, apparatus 10 is placed so that section 30a of lower hook 30 is inserted through a perforation or hole in basket 70, then basket 70 with apparatus 10 held in place are both lowered so that upper hook 20 is hooked over a top rim 60a of pot 60. Then, basket 70 may be released, at which time one side of basket 70 is suspended by apparatus 10 from top rim 60a while the opposite side of basket 70 rests against the opposite inner wall of pot 60. The placement of apparatus 10 in a perforation of basket 70 may be adjusted as necessary to yield a desired height of basket 70 within pot 60. By way of example, basket 70 may be suspended slightly above liquid level 80, which permits drainage while keeping the center of gravity of the basket and pot as low as possible for safety purposes. However, it is understood that basket 70 may be suspended within pot 60 at other heights relative to liquid level 80, for example below liquid level 80 if only partial drainage of the contents of basket 70 is desired, or at a height substantially above liquid level 80.

By the above description, it can be seen that the apparatus of the present invention provides a simple, low cost, but highly useful and effective means of suspending a basket within a pot of a cooking vessel, without an individual or individuals having to "hold up" the basket by hand or by means of an overhead frame or the like.

When drainage of the contents of basket 70 is complete, apparatus 10 may be advantageously used in at least partially inverting basket 70 to pour out and thus serve the food contained therein. Basket 70 is lifted completely out of pot 60, preferably by bail 70a or other like means. Upon bringing basket 70 to a serving table, as shown in FIG. 6, apparatus 10 may be inserted into a perforation in or near the bottom of basket 70, then used to lift the lower end of basket 70 up, thereby permitting easy pouring out of the food contained therein onto the table.

Although the description above contains many specificities, these should not be construed as limiting the scope of the invention but as merely providing illustrations of some of the presently preferred embodiments of the invention. For example, the shapes and dimensions of upper and lower hooks 20 and 30 and intermediate section 40 may be altered to suit particular basket/pot combinations; handle 50 may be a closed loop, a T-shape, or other shape providing secure gripping; the cross section shape of the different sections of apparatus 10 may be rectangular, circular, oval, or other shape; and different materials may be used, such as plastic composites, metals, and the like. Furthermore, more than one of apparatus 10 could be used to suspend a basket within a pot, holding a basket completely level within the pot if desired.

Thus the scope of the invention should be determined by the appended claims and their legal equivalents, rather than by the examples given.

I claim:

1. An apparatus for suspending an inner basket within an outer pot of a basket and pot cooking vessel, comprising:

a generally S-shaped structure comprising an upper hook, a lower hook, and an intermediate section joining said upper hook and said lower hook, said upper hook and said lower hook substantially oppositely-facing one another, said upper hook adapted for releasable engagement over a top rim of said pot, a terminal section of said lower hook forming an angle with said intermediate section suitable for insertion of said terminal section of said lower hook into a perforation in the basket, said terminal section of said lower hook adapted for releasable engagement within said perforation; and a handle attached to said upper hook.

2. The apparatus of claim 1, wherein said handle comprises a closed loop.

3. The apparatus of claim 1, wherein said handle comprises a generally T-shaped member.

4. The apparatus of claim 1, wherein said angle between said terminal section of said lower hook and said intermediate section is between about ninety degrees and about ten degrees.

5. The apparatus of claim 4, wherein said handle comprises a closed loop.

6. The apparatus of claim 5, wherein said apparatus is comprised of a plastic material.

7. A cooking vessel, comprising:

(a) a pot having a top rim;
   (b) a perforated basket removably contained within said pot and movable to a desired height within said pot, said basket disposed at a desired height within said pot;
   (c) a generally S-shaped structure comprising an upper hook, a lower hook, and an intermediate section joining said upper hook and said lower hook, said upper hook and said lower hook substantially oppositely-facing one another, said upper hook adapted to be removably hooked over said top rim of said pot, a terminal section of said lower hook forming an angle with said intermediate section suitable for insertion of said terminal section of said lower hook into a perforation in said basket, said terminal section of said lower hook adapted for removable insertion into said perforation, said terminal section of said lower hook of said structure removably inserted into a perforation in said basket, said upper hook of said structure removably hooked over said top rim of said pot, one side of said basket supported by said lower hook and the opposite side of said basket resting against an inner wall of said pot at a point substantially opposite a point where said structure is hooked over said top rim, thereby suspending said basket at a desired height within said pot.

8. The apparatus of claim 7, wherein said angle between said terminal section of said lower hook and said intermediate section is between about ninety degrees and about ten degrees.

9. The apparatus of claim 8, wherein said handle comprises a closed loop.

10. The apparatus of claim 9, wherein said apparatus is comprised of a plastic material.

11. A method of suspending a basket within a pot of a cooking vessel, comprising the steps of:

(a) providing a pot having a removable basket therein;
    (b) lifting said basket to a desired height within said pot;
    (c) providing an apparatus comprising a generally S-shaped structure comprising an upper hook, a lower hook, and an intermediate section joining said upper hook and said lower hook, said upper hook and said lower hook substantially oppositely-facing one another, said upper hook adapted for releasable engagement over a top rim of said pot, a terminal section of said lower hook forming an angle with said intermediate section suitable for insertion of said terminal section of said lower hook into a perforation in the basket, and a handle attached to said upper hook;

(d) removably inserting said terminal section of said lower hook into a perforation in said basket; and (e) lowering said basket and said apparatus together until said upper hook removably hooks over said top rim of said pot and one side of said basket is suspended from said lower hook and an opposite side of said basket rests against an inner wall of said pot substantially opposite a point at which said structure engages said top rim.

* * * * *